United States Patent
Bailey et al.

(10) Patent No.: US 8,380,757 B1
(45) Date of Patent: Feb. 19, 2013

(54) TECHNIQUES FOR PROVIDING A CONSOLIDATED SYSTEM CONFIGURATION VIEW USING DATABASE CHANGE TRACKING AND CONFIGURATION FILES

(75) Inventors: Lorenzo Bailey, Framingham, MA (US); Yong Wang, Westborough, MA (US); Utkarsh Vipul, Mansfield, MA (US); Ken Kim, Worcester, MA (US); Xuan Tang, Hopkinton, MA (US); Muhamad Djunaedi, Northborough, MA (US)

(73) Assignee: EMC Corporation, Hopkinton, MA (US)

( * ) Notice: Subject to any disclaimer, the term of this patent is extended or adjusted under 35 U.S.C. 154(b) by 31 days.

(21) Appl. No.: 13/065,631

(22) Filed: Mar. 25, 2011

(51) Int. Cl.
*G06F 7/00* (2006.01)
(52) U.S. Cl. .................... 707/803; 717/109; 715/513
(58) Field of Classification Search .................. 717/109; 715/513; 707/803
See application file for complete search history.

(56) References Cited

U.S. PATENT DOCUMENTS

| | | | | |
|---|---|---|---|---|
| 6,493,727 | B1 * | 12/2002 | Huang et al. | 707/610 |
| 2004/0088298 | A1 * | 5/2004 | Zou et al. | 707/10 |
| 2006/0224638 | A1 * | 10/2006 | Wald et al. | 707/200 |
| 2010/0192057 | A1 * | 7/2010 | Majidian | 715/237 |

* cited by examiner

*Primary Examiner* — Cheyne Ly
(74) *Attorney, Agent, or Firm* — Muirhead and Saturnelli, LLC

(57) ABSTRACT

Described are techniques for providing a consolidated logical view of a system. A plurality of database tables associated with a plurality of processing nodes of a data storage system is provided. The plurality of database tables provides a plurality of individual views of the data storage system and each of the individual views represents a view of the data storage system for a different processing node. A notification is received regarding a modification to one or more of the database tables. The notification identifies an operation performed causing the modification and providing data associated with the modification. A merge database table is modified that provides a consolidated view of said plurality of individual views. The modifying is performed in accordance with the notification and a configuration file including logic describing processing performed to merge the plurality of individual views.

20 Claims, 9 Drawing Sheets

TECHNIQUES FOR PROVIDING A CONSOLIDATED SYSTEM CONFIGURATION VIEW USING DATABASE CHANGE TRACKING AND CONFIGURATION FILES

BACKGROUND

1. Technical Field

This application relates to techniques used in connection with providing a consolidated system configuration view.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

In connection with data storage systems, or more generally any type of system, multiple computer processing nodes may provide information regarding one or more components of the system. Information from the multiple nodes may be presented in a collective view to provide for a consolidated logical view of the system in terms of the components, state of the components, and the like. Such a consolidated view may be used, for example, in connection with performing system management.

SUMMARY OF THE INVENTION

In accordance with one aspect of the invention is a method for providing a consolidated logical view of a system comprising: providing a plurality of database tables associated with a plurality of processing nodes of a data storage system, wherein said plurality of database tables provides a plurality of individual views of the data storage system, each of said plurality of individual views representing a view of the data storage system for a different one of said plurality of processing nodes; receiving notification regarding a modification to one or more of said plurality of database tables, said notification identifying an operation performed causing the modification and providing data associated with the modification; and modifying a merge database table providing a consolidated view of said plurality of individual views, wherein said modifying is performed in accordance with said notification and a configuration file including logic describing processing performed to merge said plurality of individual views. The data storage system may be a unitary storage system including said plurality of processing nodes, each of the processing nodes being a computer processor. The method may include providing the merge database table to a user interface, said user interface providing said consolidated view to a user. The method may include polling each of said plurality of processing nodes for a current set of state information describing a state of the data storage system in accordance with what components of the data storage system are accessible or visible to said each processing node. The plurality of processing may nodes include a single master node and said single master node performs said polling to obtain a current set of state information for itself and from each other node included in said plurality of processing nodes. The single master node may perform said modifying and communicates with a user interface providing said consolidated view to a user. Each of the plurality of processing nodes may include a same set of software components, said set of software components including a platform abstraction layer, said platform abstraction layer of said single master node communicating with said platform abstraction layer of each other node included in said plurality of processing nodes to obtain a current set of state information from said each other node. The set of software components may include one or more drivers, said platform abstraction layer of said set being an interface layer in communication with said one or more drivers to collect information for said polling. The data storage system may be a first of a plurality of data storage systems, each of said plurality of data storage systems including a plurality of processing nodes, each of said plurality of processing nodes being a computer processing node. Each of the plurality of data storage systems other than said first data storage system may report information to the single master node of the first data storage system regarding a state of said each data storage system. Each of said plurality of data storage systems other than said first data storage system may include a single master node that collects first information about itself and from other processing nodes of said each storage system and the single master node of said each data storage system reports the first information collected to said single master node of the first data storage system. The method may also include defining database triggers for said plurality of database tables to provide notification upon the occurrence of a modification to any of said plurality of database tables in accordance with any one of a plurality of operations causing the modification. The plurality of operations may include a new, a change and a delete with respect to a row of one of the plurality of database tables. The configuration file may include a plurality of rules indicating how to resolve any change conflicts with respect to multiple ones of said plurality of database tables and said merge database table. The plurality of processing nodes may include a single master node, a first of said plurality of database tables indicates a view of said single master node and a second of said plurality of database tables indicates a view of a second of said plurality of processing nodes, said plurality of rules including a first rule indicating that modifications made to said first database table of said single master node override any conflicting modifications made to said second database table. A first change may be made to a first row of the first database table and a second change may be made to a second row of the second database table, said first row and said second row representing information about a same object corresponding to a component in the data storage system, said first rule resulting in said merge table including said first row rather than said second row. The plurality of rules may include a first set of one or more static rules and a second set of one or more dynamic rules, each of said second set of dynamic rules including a callback to a method, said modifying said merge table including invoking the method. The method may be invoked to provide additional information used in connection with said modifying said merge table.

In accordance with another aspect of the invention is a system comprising: a data storage system; a user interface that provides a consolidated logical view of components included in the system; and wherein the data storage system includes: a plurality of processing nodes; a plurality of database tables associated with said plurality of processing nodes; wherein said plurality of database tables provides a plurality of individual views of the data storage system, each of said plurality of individual views representing a view of the data storage system for a different one of said plurality of processing nodes; a database providing notification regarding a modification to any of said plurality of database tables, said notification identifying an operation performed causing the modification and providing data associated with the modification; and a merge database table providing a consolidated view of said plurality of individual views, wherein said merge database table is modified in accordance with said notification and a configuration file including logic describing processing performed to merge said plurality of individual views, wherein code of said user interface, said plurality of database tables, said configuration file, said database and said merge database table are stored in a memory.

In accordance with another aspect of the invention is a computer readable medium comprising code stored thereon for providing a consolidated logical view of a system, the computer readable medium comprising code stored thereon for: providing a plurality of database tables associated with a plurality of processing nodes of a data storage system, wherein said plurality of database tables provides a plurality of individual views of the data storage system, each of said plurality of individual views representing a view of the data storage system for a different one of said plurality of processing nodes; receiving notification regarding a modification to one or more of said plurality of database tables, said notification identifying an operation performed causing the modification and providing data associated with the modification; and modifying a merge database table providing a consolidated view of said plurality of individual views, wherein said modifying is performed in accordance with said notification and a configuration file including logic describing processing performed to merge said plurality of individual views.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF
EMBODIMENT(S)

Figure 1:
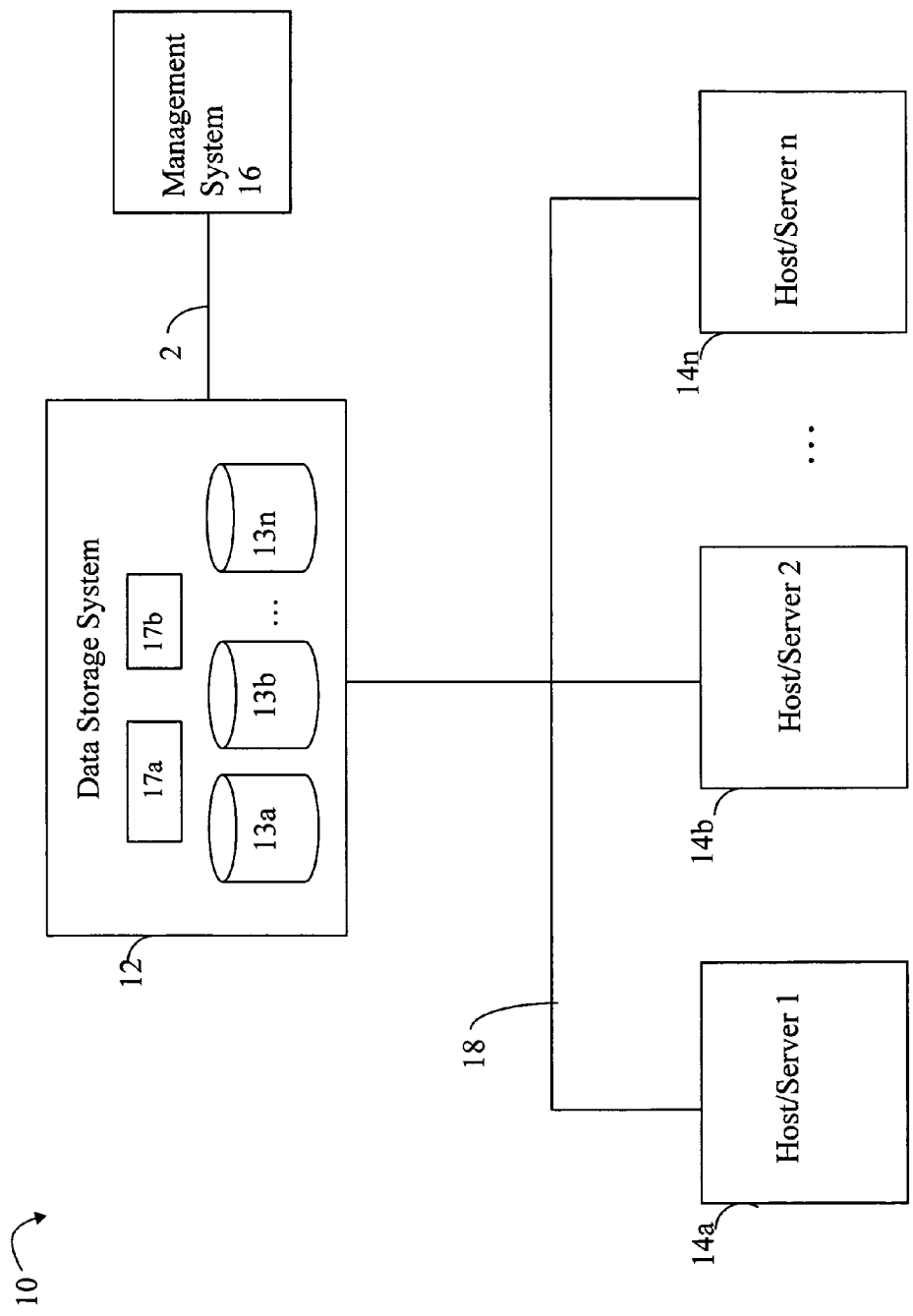
FIG. 1 is an example of an embodiments of a system that may utilize the techniques described herein.

Referring to FIG. 1, shown is an example of an embodiment of a system that may be used in connection with performing the techniques described herein. The system 10 includes one or more data storage systems 12 connected to server or host systems 14a-14n through communication medium 18. The system 10 also includes a management system 16 connected to one or more data storage systems 12 through communication medium 2. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 2 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 2 may be a LAN connection and the communication medium 18 may be an iSCSI or Fibre Channel connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 2 by any one of variety of connections in accordance with the type of communication medium 2. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 2, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the data storage systems 12 may include one or more data storage systems such as one or more of the data storage systems, such as data storage arrays, offered by EMC Corporation of Hopkinton, Mass. Each of the data storage systems may include one or more data storage devices 13a-13n, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes 13a-13n. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

For purposes of illustration, the techniques herein will be described with respect to a single unitary data storage system, such as single data storage array, including two service processors or compute processing units. Techniques herein may be more generally use in connection with any one or more data storage system each including a different number of service processors than as illustrated herein. The data storage system 12 may be a data storage array, such as a CLARiiON® data storage array by EMC Corporation of Hopkinton, Mass., including a plurality of data storage devices 16a-16n and two service processors 17a, 17b. The service processors 17a, 17b may be computer processing units included in the data storage system for processing requests and commands. In connection with performing techniques herein, an embodiment of the data storage system may include multiple service processors including more than two service processors as described. The CLARiiON® data storage system mentioned above may include two service processors 17a, 17b for performing processing in connection with servicing requests. Additionally, the two service processors 17a, 17b may be used in connection with failover processing when communicating with the management system 16. Client software on the management system 16 may be used in connection with performing data storage system management by issuing commands to the data storage system 12 and/or receiving responses from the data storage system 12 over connection 2. In one embodiment, the management system 16 may be lap top or desk top computer system.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Figure 2:
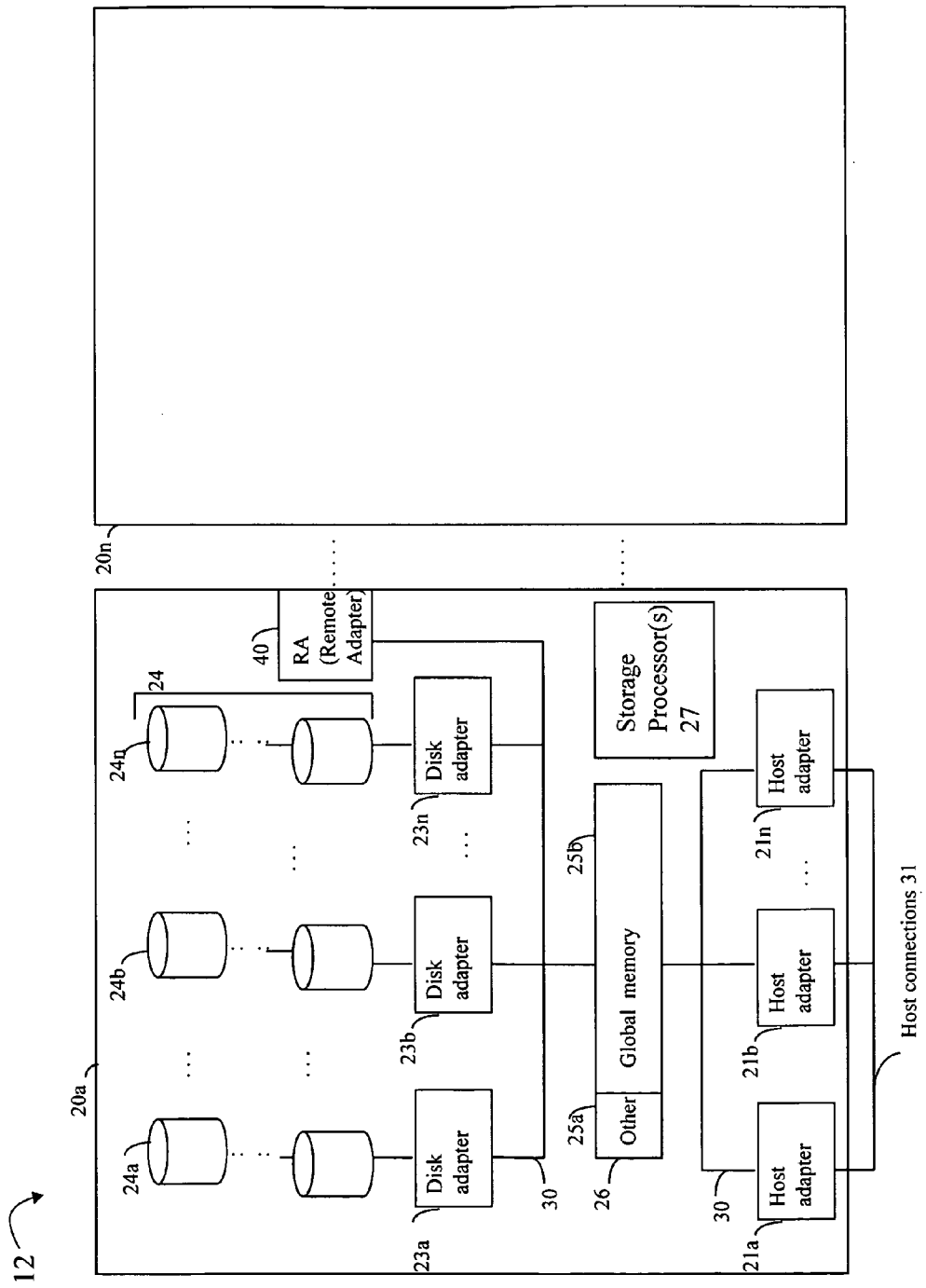
FIG. 2 is an example illustrating details of a data storage system in accordance with techniques herein.

Referring to FIG. 2, shown is an example of an embodiment of the data storage system 12 that may be included in the system 10 of FIG. 1. Included in the data storage system 12 of FIG. 2 are one or more data storage systems 20a-20n as may be manufactured by one or more different vendors. Each of the data storage systems 20a-20n may be a data storage array inter-connected (not shown) to other data storage array(s). Additionally, as noted above, the data storage systems may also be connected to the host systems through any one or more communication connections 31. In this example as described in more detail in following paragraphs, reference is made to the more detailed view of element 20a. It should be noted that a similar more detailed description may also apply to any one or more of the other elements, such as 20n, but have been omitted for simplicity of explanation.

Each of the data storage systems, such as 20a, may include a plurality of storage devices such as disk devices or volumes included in an arrangement 24 consisting of n rows of disks or more generally, data storage devices, 24a-24n. In this arrangement, each row of disks may be connected to a disk adapter ("DA") or director responsible for the backend management of operations to and from a portion of the disks 24. In the system 20a, a single DA, such as 23a, may be responsible for the management of a row of disks, such as row 24a. In a data storage system such as by EMC Corporation, a backend DA may also be referred to as a disk controller. The DA may performed operations such as reading data from, and writing data to, the physical devices which are serviced by the DA.

The system 20a may also include one or more storage processors 27. Each of the storage processors 27 may be CPU and an embodiment may include any number of such processors. For example, the CLARiiON® data storage system by EMC Corporation includes two storage processors. The system 20a may also include one or more host adapters ("HAs") or directors 21a-21n. Each of the HAs may be used to manage communications and data operations between one or more host systems and the global memory. In an embodiment, the HA may be a Fibre Channel Adapter (FA) or other adapter which facilitates host communication. The HA communicates with a component of the host such as a host bus adapter (HBA). Generally, directors may also be characterized as the different adapters, such as HAs (including FAs), DAs RAs and the like, as described herein. Components of the data storage system, such as an HA, which may communicate with a host may also be referred to as front end components. Within the data storage system, components, which may be characterized as backend components, communicate with a front end component. An example of a backend component is a DA. In connection with data storage systems such as by EMC Corporation, various types of directors or adapters may be implemented as a processor, or, more generally, a component that includes the processor. Examples of directors are disk adapters (DAs), host adapters (HAs), and the like.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

Also shown in the storage system 20a is an RA or remote adapter 40. The RA may be hardware including a processor used to facilitate communication between data storage systems, such as between two of the same or different types of data storage systems.

Figure 2A:
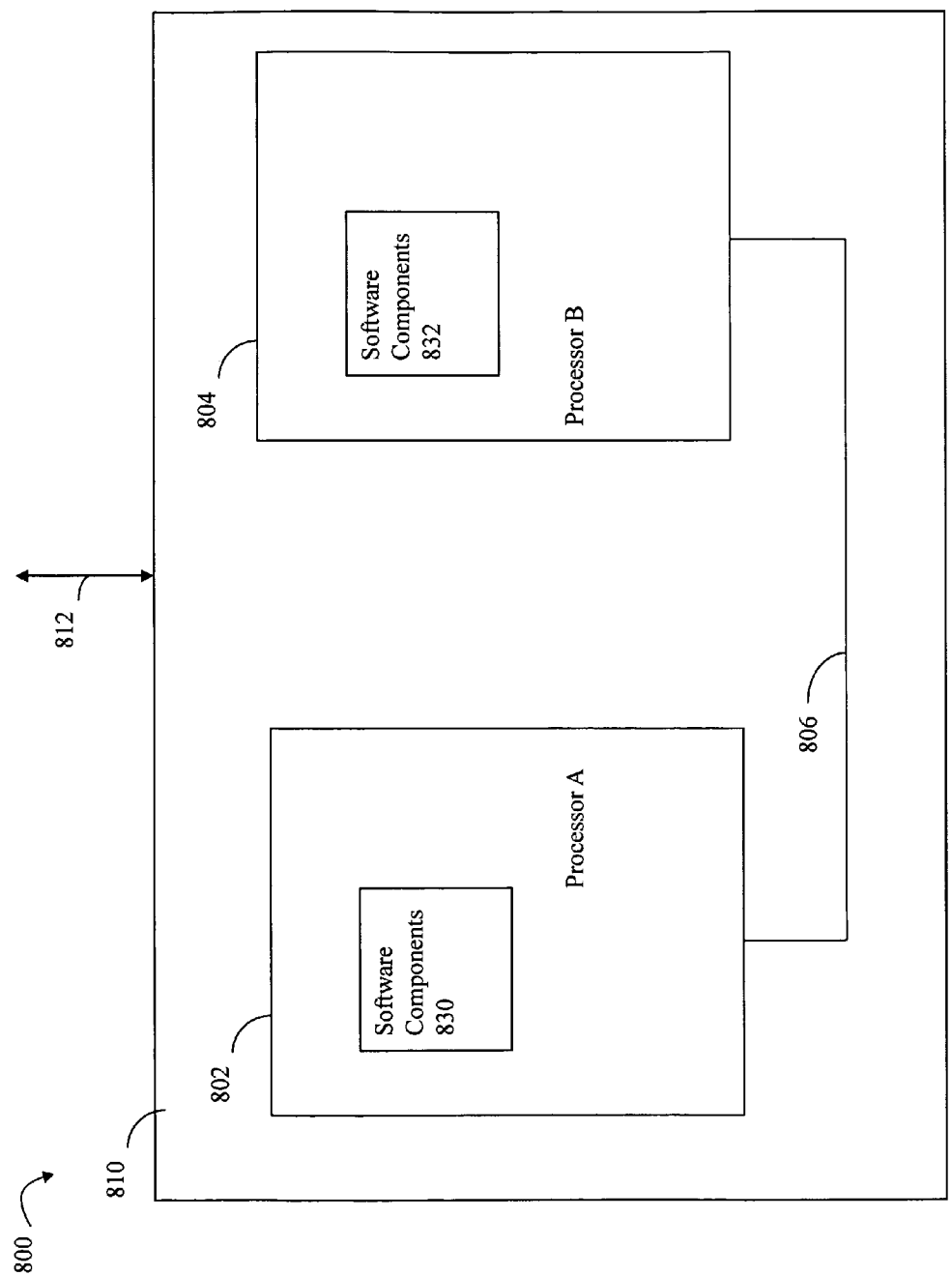
FIG. 2A is an example illustrating a data storage system including multiple service processors in an embodiment in accordance with techniques herein.

Referring to FIG. 2A, shown is a block diagram of components that may be included in a data storage system 810. In the example 800, there are two service processors 802, 804 (also referred to as service processors A and B) although a data storage system and techniques herein may be used in an embodiment in which the data storage system includes more than two service processors as mentioned above. Service processor 802 includes software components or modules 830 executing thereon. Service processor 804 includes software components or modules 832 executing thereon. Service processor 802 and 804 may communicate using 806 which is described in more detail below. Element 812 may represent a single logical communication connection used for data storage system management transmissions between the data storage system 810 and one or more external clients. The software components or modules 830 and 832 may be software modules included in data storage system management software residing and executing on the data storage system 810 including software used in connection with communicating with external clients over network connection 812.

The two service processors 802, 804 may control the operation of the data storage system. The processors may be configured to process requests as may be received from the hosts, other data storage systems, management system, and other components connected thereto. Each of the processors 802, 804 may process received requests and operate independently and concurrently with respect to the other processor. In the example 800, each processor is illustrated as having one or more software modules (e.g., web server, drivers, other modules etc.) executing thereon. An embodiment may have a same set of one or more software modules executing on each processor so that either of the processors may service a received request. The example 800 may illustrate the state of the data storage system with software modules that are loaded as a result of booting the data storage system. In the example 800, the processors 802 and 804 have successfully completed the boot process leaving both 802 and 804 in what may be characterized as a healthy state with respect to data storage system management functionality. A service processor may be characterized as being in the healthy state if the service processor has the ability to service normal data storage system management messaging traffic over a communication connection, such as a network connection, used for data storage management. In other words, a processor may be characterized as healthy if it is determined that the processor is able to perform necessary processing and communications in connection with handling typical data storage system management transmissions over a connection used for normal data storage management messaging traffic. A processor may otherwise be characterized as being in an unhealthy state if any deficiency is determined with respect to the foregoing, such as a hardware and/or software problem, so that the processor is unable to be used in connection with handling data storage system management transmissions. Once booted, a processor may transition between the states of healthy and unhealthy in accordance with problems that may occur and/or be corrected over time.

With respect to data storage management requests, operations, and the like, as may be received from a client, such as the management system 16 of FIG. 1 in connection with the techniques herein, the client may interact with a designated one of the two processors 802, 804 over the communication connection 812. The designated one of the processors may be characterized as the master with the other processor designated as the slave. In connection with one embodiment in accordance with techniques herein, the data storage system may operate in accordance with a master-slave or active-passive model when communicating with the management system 16. In accordance with the master-slave model, only one of the processors 802, 804 and only one instance of the software modules executing thereon, may be designated as a "master" with the other processor and associated software modules thereon designated as the "slave". It should be noted that as used herein, the terms "active" and "master" may be used interchangeably to refer to the designated active or master processor in the master-slave or active-passive model. Similarly, the terms "slave" or "passive" may be used interchangeably to refer to the one or more processors other than the active or master processor in accordance with the master-slave or active-passive model.

In the example 800, instances of the software components 830, 832 executing, respectively, on processors 802, 804 may communicate over connection 806. The connection 806 may be a bus or other communication connection to facilitate inter-processor communication between the drivers. The connection 806 may be characterized as internal to the data storage system or local with respect to residing on the data storage system and used for communicating between components on the data storage system. The connection 806 may also be referred to as the common management interconnection (CMI) and may be characterized as part of an internal network over which inter-processor communications may occur. Thus, one of the service processors may use connection 806 to communication with the other service processor. As will be described in more detail in following paragraphs, each service processor may include code which facilitates communication with the other service processor using the connection 806 for inter-service processor communication. In particular, code of a first service processor may use connection 806 to obtain information collected from another service processor for use in connection with the first service processor providing a consolidated view of the data storage system such as when providing such information in response to a data storage system management peer request from the management system 16.

The processors 802, 804 may also communicate over another connection 812. The connection 812 may represent a TCP/IP or other network connection over which instances of the software components 830, 832 on processors 802, 804 (respectively) may communicate with other externally networked components. Connection 812 may correspond to a single logical connection used, for example, to communicate with a client such as the management system 16 running a web browser displaying a GUI (graphical user interface). The connection 812 may be characterized as a single communication connection between the data storage system and the management system over which the user on the management system 16 may interact with the data storage system in performing data storage system management tasks. The processors 802, 804 may send and/or receive transmissions over connection 812 from the management system 16 of FIG. 1. In one embodiment, the connection 812 may be part of a dedicated LAN connection for management operations. Host I/O requests may be received at the data storage system on different incoming ports such as, for example, Fibre channel or iSCSI ports not illustrated.

Only one of the processors 802, 804 is designated as active or the master at any time. Thus, at any point in time, at most one of the SPs 802, 804 communicates with a client in connection with handling data storage system management transmissions over the single connection 812. In the event that an active maker processor transitions from a healthy to an unhealthy state, the passive slave processor assumes the role of master if it is in a healthy state. In connection with techniques herein, when failover processing results in a processor assuming the role of master, the software components thereon may also be designated as the instance of the software modules which are active and communicate with the client. As described herein, a processor may be characterized as having an unhealthy state if the processor and/or software components executing thereon are not able to communicate with and/or process requests from an external client, such as the management system 16, over a network. Detection of the state of a processor and/or software components executing thereon as healthy or unhealthy may be performed using a variety of different techniques such as, for example, by the processor itself and/or its peer processor. Such techniques may include, for example, periodically having each processor test communications with the other processor over connections 806, determining a status regarding the software modules on a service processor and its ability to communicate over the external communication connection used for data storage system management transmissions, receiving a notification regarding status of a peer processor, and the like.

The connection 812 may have a single network address, such as an IP address, over which the active processor and code executing thereon may communicate with the management system 16 in connection with performing the techniques herein. The software components 830, 832 may represent software components or modules as described herein in more detail on each of the processors. It should be noted that the data storage system 810 of the example 800 includes other components, such as storage devices, which are omitted from the example 800 for simplicity in illustrating the dual processors 802, 804.

In connection with techniques herein, the management system 16 may issue a request to the data storage system such as illustrated in FIG. 2A. The request may be to provide a logical system configuration view regarding components of the data storage system, the state of such components, and the like. In connection with providing such a view, information may be gathered from each of the service processors A and B of FIG. 2A. Each service processor may be configured to view a same set of components of the data storage system. For example, each service processor may view all storage devices and groups of storage devices of the storage system. Additionally, each service processor may also provide information regarding components viewed/visible locally or only by that service processor. For example, each service processor may provide a view of information regarding components used only by the service processor such as fans and power supplies used only by each service processor. To provide a complete, consistent and consolidated view of the data storage system configuration from both service processors, processing may be performed by a service processor to aggregate information locally by the service processor along with information collected from the other service processor. For example, service processor A may be the master and perform such processing by collecting a local view of configuration information as viewed by service processor A and also requesting and obtaining configuration information as viewed by service processor B. Service processor A may perform processing to combine both its local view and the view in connection with the configuration information collected from service processor B. To perform such collection, the service processors may communicate using connection 806 described above. Furthermore, in connection with such processing, there may be conflicts or inconsistencies in the different processor views as reflected in the configuration information for each processor. Consolidation processing may include resolving any such conflicts in a consistent way such that the same processing may be performed by either service processor A or B and the same consolidated view obtained. As an example, consider a new storage device that has been added to the data storage system where the new device is configured to be visible to both service processors A and B. However, due to the time at which information is collected from both service processors, the new device is only visible to storage processor A. Thus, at the time processor A performs aggregation and consolidation of its local configuration information and other configuration information from service processor B, there is a conflict in that only one of the service processors includes the new storage device in its information. When providing a consolidated system view of the data storage system configuration, the consolidation processing may evaluate and determine what to include in the consolidated view regarding the new storage device due to the foregoing inconsistency (e.g., one storage processor view includes the new device and the other service processor's view does not, and both views should include the same data storage devices). The foregoing inconsistency may exist for any number of reasons including, for example, a simple timing issue as to when the configuration information for service processor B is obtained. It may be that the configuration information was collected from B prior to B having a chance to recognize the new storage device and the new storage device will be recognized in the next set of configuration information collected, such as at a next polling interval or next occurrence of a predefined time interval. The inconsistency may also be due to a faulty physical connection or cabling to/from service processor B.

It should be noted that in following paragraphs for illustration of the techniques herein, an embodiment is described using the active/passive or master/slave SP model. However, an embodiment in accordance with techniques herein may utilize other SP models in connection with providing the consolidated view. For example, as a variation to the foregoing, an embodiment in accordance with techniques herein may implement an active-active model in connection with providing a consolidated view of data storage configuration information. In the active-active model with the multiple SPs of a data storage system, a request from a client for the data storage configuration information may be provided by any of the SPs at any time thereby having any SP provide the consolidated view in accordance with techniques herein at any time depending on which SP services a client's request. As a further variation in an embodiment which has more than 2 SPs, an embodiment may designate a portion of the SPs as active in connection with servicing a client request at any time, where the portion may be less than all of the SPs but more than a single SP. In such embodiments in a data storage system having multiple SPs, each SP of the data storage system may collect and consolidate configuration from every other SP and perform techniques described herein to provide a consolidated view of the data storage system across the multiple SPs.

What will be described in following paragraphs are techniques that may be used in connection with software components to gather data from multiple nodes, and then take advantage of database change tracking and customizable business logic implementations to populate data into a merged database table to reflect the consolidated system view of the data storage system. The merging and consolidation processing may be performed using business logic such as rules for consolidating the data and providing hooks for implementing customized business logic. The rules may include rules providing for static and dynamic merging. As described in more detail below, rules utilizing dynamic merging may utilize call backs to obtain configuration and/or status information at runtime during the consolidation processing. The rules to be applied may be specified through configuration files. Use of such techniques provides a centralized approach with the capability of easily and efficiently consolidating data from more than two nodes.

The techniques herein may be used with an object-based model using database tables. In such an embodiment using an object-based model, a row in a database table may correspond to an object instance and each column in the table may correspond to an attribute or property of the object. The object may correspond to, and represent the state of, a physical or logical entity in the data storage system. For example, an object may represent a physical component such as a fan, power supply, port, logical storage device, or physical storage device. The physical and/or logical component may be characterized by state information represented as properties or attributes of an object. For example, an object corresponding to a physical storage device may have attributes representing the total available storage capacity, an amount of unused or free storage capacity, physical device characteristics, and the like. An object may also represent a logical entity such as a RAID group, LUN or LV, storage group of one or more LUNs, and the like. A logical entity such as a RAID group may be represented by an object having attributes such as indicating a RAID level of the RAID group (e.g., RAID-0, 1, 5, or 6), a number of data and/or parity drives, and the like.

Figure 3:
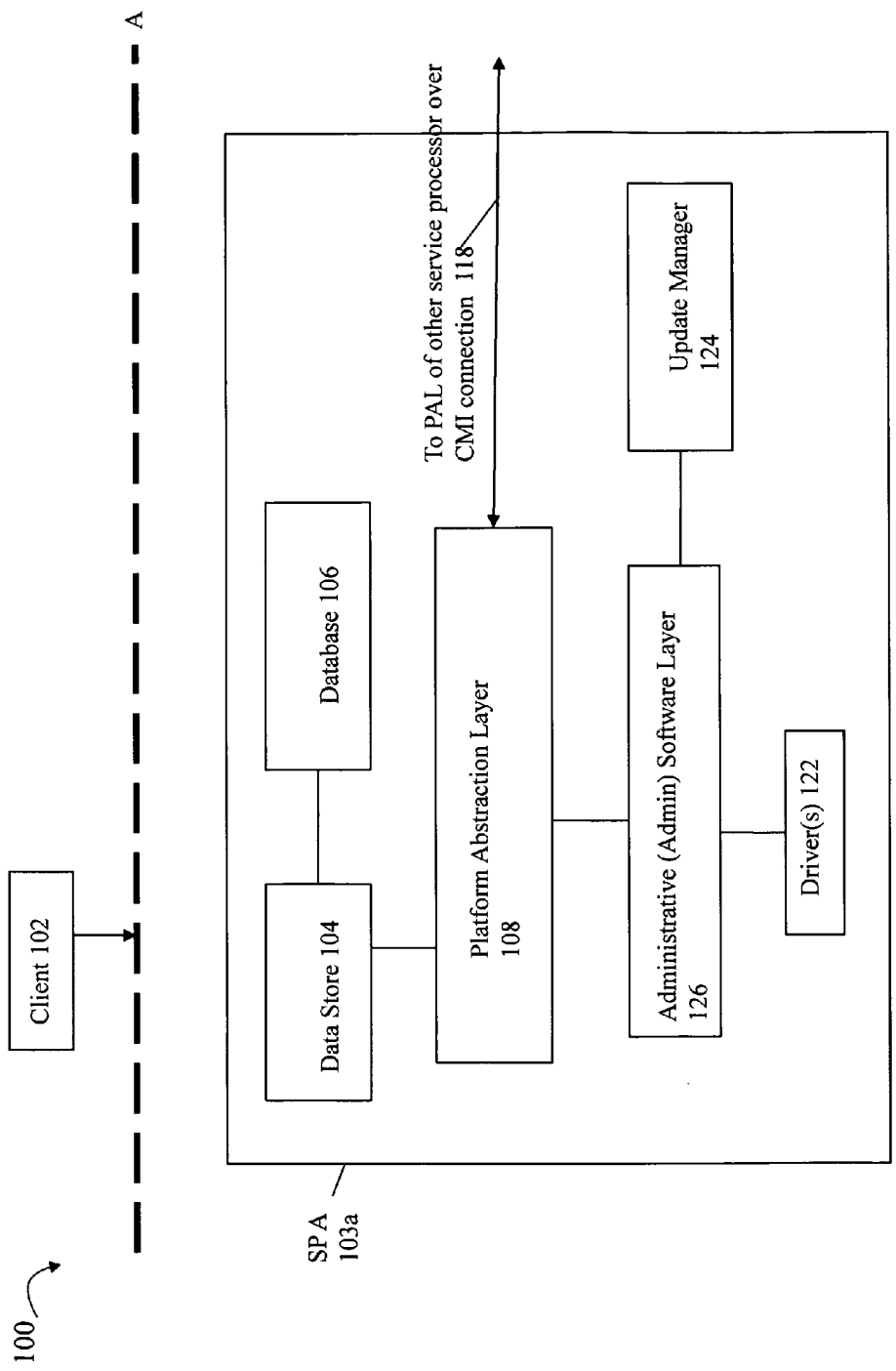
FIGS. 3, 4 and 5 are examples illustrating data flow and communications between components in an embodiment in accordance with techniques herein.

Referring to FIG. 3, shown is an example of software components that may be included in an embodiment in accordance with techniques herein. The example 100 includes components of the data storage system and an external client 102. As described in more detail below, the components of 103a may be used in connection with providing a consolidated logical view of the data storage system. The dashed line denoted as A may represent a partitioning of components included in the data storage system (e.g., those below the dashed line A) and those which are external to the data storage system (e.g., those above the dashed line A). The example 100 includes a remote or external client 102 and components 103a of one of the service processors, SP A of the data storage system. It should be noted that although an instance of the components of 103a are illustrated with respect to only a single service processor A, each other service processor of the data storage system, such as service processor B, may also include an instance of the components of 103a. Element 103a includes the following software components: data store 104, database 106, platform abstraction layer (PAL) 108, admin (administrative) software layer 126, and driver(s) 130. A client, such as external or remote client 102, may request to receive a consolidated logical view of components of the data storage system and may communicate with one of the storage processors A, B currently designated as the master. For example, assume processor A is the master processor.

The drivers 122 collect information of the local service processor A which is reported through a call stack of software layers including code of the admin software layer 126, PAL 108, and data store 104, where such information may then be stored in the database 106. The update manager 124 may generate a request to poll the drivers 122 of processor A and other processors for configuration state information. The update manager 124 may generate a polling request in response to an occurrence of a trigger event. The trigger event may be an occurrence of a defined polling interval, as well as an occurrence of one or more other defined events. The update manager 124 may issue the request to the admin layer 126 which then obtains the local state information for processor A from the drivers 122. The admin layer 126 then communicates the state information for processor A to the PAL 108 which then communicates the information to the data store 104. Additionally, the admin software layer 126 may communicate with the PAL 108 of processor A to request configuration state information from processor B as illustrated by 118 and described below in more detail. The data store 104 may process the received state information (e.g., for both processor A and B) and then populates the database 106 by performing database operations such as by issuing appropriate database commands including update, insert and/or delete database commands.

PAL 108 may serve as an interface facilitating communications between lower layers or software components (e.g., such as the admin software layer 126 and drivers 122) and upper layers or software components (e.g., such as the data storage 104 and database 106). Upon the occurrence of a polling interval as signaled by the update manager 124, PAL 108 of service processor A may collect data from the local processor A's drivers and may also communicate with other PALs included in other service processors (e.g., service processor B over the CMI connection 118). In turn, the PAL of processor B (not illustrated) queries its local processor B's drivers for the information in a manner similar to that as described for processor A and returns the information to the requestor, PAL of processor A. The requested information from both service processor A's drivers 122 and from other service processors (e.g., as communicated by PAL of processor B) may be returned to the PAL 108 of service processor A, forwarded to data 104 and then stored in database 106. The database of 106 for the collected configuration state information may include data stored in one or more database tables where such tables include one or more rows of data elements. The data store 104 may perform database operations which update the appropriate database tables of 106, and portions thereof, in accordance with the received state information. As described below, the database may provide notification regarding which one or more rows of the database tables have been modified as a result of the performing the database operations to store the received state information. In one embodiment, a software module may register to receive a database notification when an operation is performed which may modify one or more database tables of the database 106.

Figure 4:
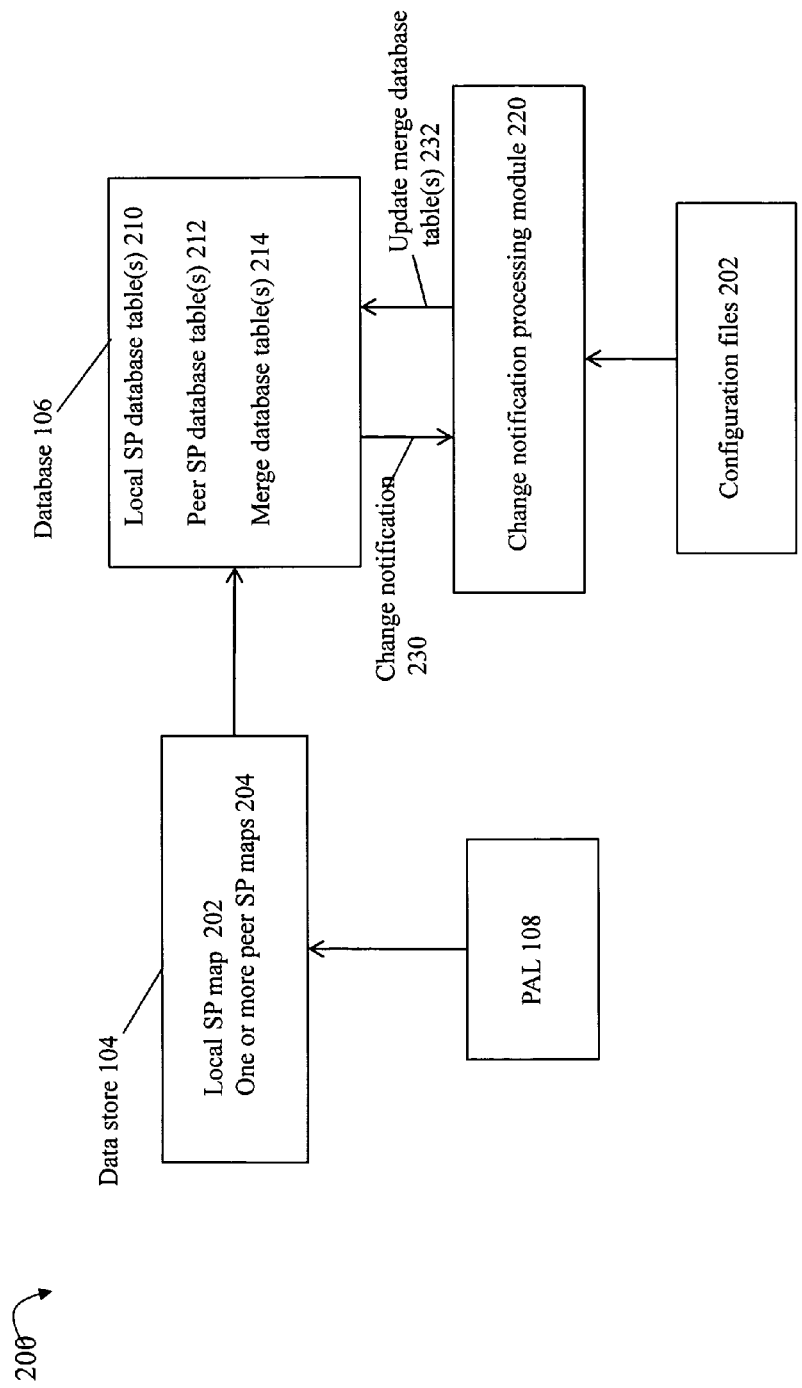

Referring to FIG. 4, shown is an example illustrating in more detail processing and data flow in an embodiment in accordance with techniques herein for some of the components of FIG. 3. The components in the example 200 may represent some of the components noted above as being included in service processor A in response to a polling query. The PAL 108 receives both the local (processor A) configuration state information and other configuration state information from processor B. The PAL 108 may transmit this information to data store 104 which creates a local SP (service processor) map 202 and one or more peer SP maps 204, one for each peer SP. In this example, there is a single peer SP, SP B so there is a single peer SP map included in 204. The local SP map 202 may represent the collected information from service processor A's drivers and processor A's view of the data storage system configuration state. The peer SP map for SP B included in 204 may represent the collected information from service processor B's drivers and processor B's view of the data storage system configuration state (e.g., as communicated from processor B's drivers and PAL to processor A's PAL). For a current polling period, the data store 104 may determine the changes or updates to each of the local SP map 202 and the peer SP maps 204 since the immediately previous polling interval. Based on this, the data store 104 may issue appropriate database commands to update the tables of the database 106. In the example 200, the database 106 may include one or more local SP database table 210, one or more per SP database tables 212 and one or more merge database tables 214. The tables 210 may include database tables of processor A's, the local processor's, data storage system configuration view. The tables 212 may include database tables of processor B's data storage system configuration view. If the embodiment includes additional peer service processors besides processor B, the database 106 also includes one or more database tables for each such peer service processor similar to those of processor B. The database 106 may also include merge database tables 214 including database tables of a consolidated or merged data storage system configuration view.

The database 106 may provide for database change tracking and notification whereby a software module may register to receive notification for one or more changes to the database. For example, the change notification processing module 220 may register to receive notification by the database 106 when there is an operation performed which modifies any of the local SP database tables 210 and any of the peer SP database table 212. The conditions or database events about which the module 220 is notified may be specified using database triggers described in more detail below. To this end, the module 220 may request (via defined database triggers) to receive notification of any such operations when performed on any of the foregoing tables of 210, 212. The operations may include, for example with reference to a single database table, database commands to delete a row of a table, update an existing row of a table, or add a new row to a database table. In an embodiment utilizing an object-based model, a row of a table may correspond to an object instance and values in each column may correspond to an attribute or property of an object. In one embodiment, database change notification may provide for notification regarding the database table row-level changes. The notification message may vary with embodiment and may, for example, identify the type of operation performed (e.g., table row delete, table row add, table row update), the modified or changed data related to the operation (e.g., what new data was added, deleted, if there was an update, both the old and new data), and the like. An embodiment may alternatively just provide a notification message about the operation performed and the database (DB) key or row identifier (ID) used to identify each row of a database table that has been modified as a result of performing the database operations. The module receiving the notification may then query the database for additional information to obtain the data related to the modification rather than have this transmitted as part of the database change tracking notification. An embodiment may also utilize a database implementing variations of the foregoing in connection with database change tracking and notification. For example, the database may optionally provide for different levels or granularity of change tracking and notification besides on a single database table row. For example, an embodiment may utilize a database providing change tracking at the database column level in addition to providing tracking and notification per database table row. All such embodiments and variations may utilize the techniques herein to provide for database change notification tracking.

Element 230 represents the change notification provided to the change notification processing module 220 by the database 106 in accordance with the module 220 registering to receive database change notifications for any of the tables 210, 212. In response to receiving such a notification as illustrated by 230, the module 220 may process the change notification in accordance with configuration files 202. The configuration files 202 may describe logic or rules for consolidating data from the local SP database tables 210, peer SP database tables 212 and merge database tables 214. The configuration files 202 may include rules, for example, which indicate how to resolve conflicts in connection with configuration information of tables 210, 212 and/or 214. The rules may identify the particular tables and properties and may include logical or conditional processing statements evaluated as part of the merging and consolidation processing of tables 210, 212 to update the merge database tables 214 providing a consolidated data storage system configuration view across all service processors (e.g., with respect to views of all service processors A and B). Element 232 represents the operation performed, such as by module 220, to appropriately update the merge database tables 214 as a result of consolidation and merge processing to merge information of the different data storage system configuration views of the service processors of the data storage system.

Configuration files 202 may include rules which are characterized as static performing static merging and may also include rules characterized as dynamic performing dynamic merging. Dynamic rules may specify a callback to a method which is invoked at runtime during consolidation and merge processing to obtain current up to date information at the time of such processing.

To further illustrate, consider a simple example where a new storage device such as a new disk drive is added to the data storage array. At the occurrence of a polling interval, data is gathered from each service processor A and B where processor A is the master processor. Processor A is also performing the consolidation and merge processing and is also therefore the local processor receiving data from its peer processor B. The configuration information collected from service processor A as stored in tables 210 indicates that SP A sees or views the new disk but not SP B. Assume the merge tables of 214 are empty. As described above, such a difference may be a latency due to the timing of the polling request where there is a delay in SP B viewing the new disk. The configuration files 202 may include a rule on how to resolve or handle this conflict between data storage system views of processors A and B. For example, there may be a rule which indicates to merge the data of the processor tables by taking the SET UNION of the database table rows. If a single device is represented as an object having a row in one of the tables, a first table of 210, a device table, may be organized by a primary key of device identifier and may include a row representing the new device. However, a second table of 212, also a device table organized by a primary key of device identifier, does not include a row representing the new device. The merge database tables 214 may similarly include a first merge device table representing the results of merging and consolidating the foregoing first and second device tables of 210 and 212. The rules of the configuration files 202 may indicate to take the union of all rows of information from the first and second device tables and store the result in the first merge device table of 214. Such a rule is an example of static merging which identifies the appropriate tables to be merged and how they are to be merged (e.g., the merge table includes a row for a device if that same device is included in a device table of any one or more service processors such as any one or more device tables of 210, 212). Rather than take the SET UNION as described above, the rules may alternatively specify to resolve the conflict in favor of the master SP's view point. For example, the first merge device table of 214 may be updated to include the new device only if the new device is included in at least the device table for service processor A, the currently designated master SP. If the new device is included in the device table for processor B but not for A and A is the master SP, the first merge device table does not include a row corresponding to the new device. Both of the foregoing are examples of static merging rules.

As a further example, consider the case where both the first and second device tables for processors A and B include a row for the new device where each row of the two tables, although describing the same device having the same device identifier, contains at least one difference with respect to a property or attribute value (e.g. at least one column of the corresponding entries of the first and second device tables for the new device differ). The rules of the configuration file 202 may indicate to resolve any such conflicts where property or attribute values differ in favor of the master SP. In this case, the first merge device table includes an entry for the new device having the property or attributes in accordance with those of the master SP A's tables in 210. The foregoing is another example of static merging that may be specified by the rules of the configuration files 202.

As yet a further illustration, consider the case where the device table of 212 for processor B includes many new devices, the device table of 210 for processor A includes no devices, and processor A is currently the master. Assume the merge tables of 214 are empty. Rather than just use rules providing for static merging as described above for this particular case (e.g., where there is such a large difference between two SP configuration views which should be the same and the fact that it is the master SP which sees the lesser number of devices), there may be another problem or reason for this difference. For example, there may be a problem with physical connections from processor A to the devices. The configuration files 202 may include a rule providing for dynamic merging by specifying a callback, such as a method, invoked to obtain additional information about the state of the physical connections used by processor A to view such devices. For example, the configuration files may identify the method invoked to obtain additional information about the state of such physical connections used by processor A where the method is invoked as a result of the change notification provided regarding the new devices to processor B's tables of 212. If such physical connections to processor A are down/not functioning, then the rule may indicate to use the device table information as described in processor B's device table even though B is not the master. The foregoing provides a pseudo-code description of the logic that may be expressed in the configuration files to implement the foregoing dynamic merging:

If (SP A is MASTER) and (device table(SP B) includes one or more new devices not included in device table (SP A)) then
   status=method_connection_status (SP A, new devices)/*
     obtain status information using method invocation during consolidation/merge processing */
   if (status NOT working) then merge device table=(SP B)/*use SP B information if SP A's connections to devices are bad/non-functional */
   If (status=working) then TAKE OTHER ACTION /*otherwise perform some other action */

In the above, method_connection_status is the invoked method that returns current status information regarding physical connections between SP A and the new devices included in SP B's device table. If the return status indicates that the connections between SP A and the devices are not working, then the merge device table of 214 uses the current contents of SP B. If the status is working, the above indicates to generally take some other defined action. The other action may be, for example, to notify the a user such as an administrator regarding the detected difference and provide information regarding the details of the detected difference, the "working" status indication of the physical connections between SP A and the new devices (e.g., returned as a result of invoking method_connection_status), and the like. In such a case, the user may then further investigate since the automated processing implemented by the configuration files 220 detected a condition which requires further user notification and action. The foregoing additional information and notification that the user needs to take some action to resolve the difference/conflict in data storage system views may be provided to a GUI of the client. This is just one example of another action that may be taken.

The foregoing examples illustrate ways in which the configuration files 202 may include rules describing logic for merging the database tables 201, 212 and/or 214 in accordance with differing and conflicting service processor view points. The rules used to implement the logic may identify, for example, names of tables and properties within each table as well as conditional processing as may be embodied or encapsulated in the configuration file. Although rules are described herein, it will be appreciated by one of ordinary skill in the art that any suitable means may be used to implement the required logic. The dynamic merging provides a customized merging where additional information may be dynamically requested as part of consolidation and merge processing on an as needed, case by case basis.

More generally, the static merging may handle conflict resolution and merging for simple or common cases detected. In contrast, the dynamic merging may be used in connection with more complex conflict resolution conditions and/or conflict resolution requiring further information for evaluation prior to determining how to consolidate or resolve a viewpoint conflict. As described above, the callback may, for example, obtain additional information about a current state of one or more components, connections, and the like, in a data storage system. The callback may also, for example, identify additional rules or tests used. For example, a rule may identify a first callback which is a first method invoked in connection with merging and consolidation processing in response to a change notification 230. As a result of invoking this first method, the first method may return information identifying one or more other methods to be further invoked. The dynamic merging may be characterized as dynamic in that although the first method may be specified in the configuration file, the information obtained as a result of the first method invocation may change or vary with the particular runtime based results returned from the method invocation.

Thus, the configuration files 202 may provide for automated data storage system configuration merging and consolidation processing (e.g. of different service processor view points). The rules may also provide a dynamic aspect to the processing with additional information gathering through the use of method calls invoked during the merging process while the configuration file rules are being processed.

A database trigger as mentioned above may have a general format of "IF CONDITION THEN ACTION", where the CONDITION identifies the condition or event occurrence being tracked and, upon the occurrence of such an event, the specified ACTION is performed. The CONDITION may identify the particular operations (e.g., such as inserting a new row in a database table, deleting a row from a database table, and updating a row of a database table) and also the database tables that are monitored (e.g., the tables of 210 and 212). As noted above, the ACTION may be to notify the module 220 upon the occurrence of an event in accordance with the defined CONDITION. Rather than have the module 220 receive a database change notification as illustrated by 230, an embodiment may also allow for the ACTION specified to identify other actions to be performed in response to a database change. For example, the ACTION of the database trigger may identify the configuration file or rules thereof to be utilized in response to the occurrence of a database change as defined in the CONDITION. To further illustrate, a first database trigger may be defined where CONDITION identifies performing an operation to add row to one of the device tables included in 210 and/or 212. The ACTION of the first database trigger may identify one or more rules or a configuration file to be used to perform merging/consolidation processing as described above. Rather than have the database change notification sent to a module identified in the ACTION, the occurrence of the event may result in invocation of a rules engine which receives as inputs the rules or configuration file identified by the ACTION, and database change notification data (e.g., identifying the database operation performed to add a row to a database table and the data associated or collected in connection with the monitored event occurrence such as the row of data added to the table).

It should be noted that an embodiment may provide for encoding some of the processing or logic of the rules alternatively within the ACTION portion of the database trigger as may be allowable in some embodiments. More generally, it may be the combination of the ACTION portion of the database trigger and rules of the configuration file that provide for proper updating/populating of the merge database tables 514. The particular processing performed by each of the ACTION portion and the rules may be partitioned between the two in a manner different than as just described as may vary with an embodiment.

Figure 5:
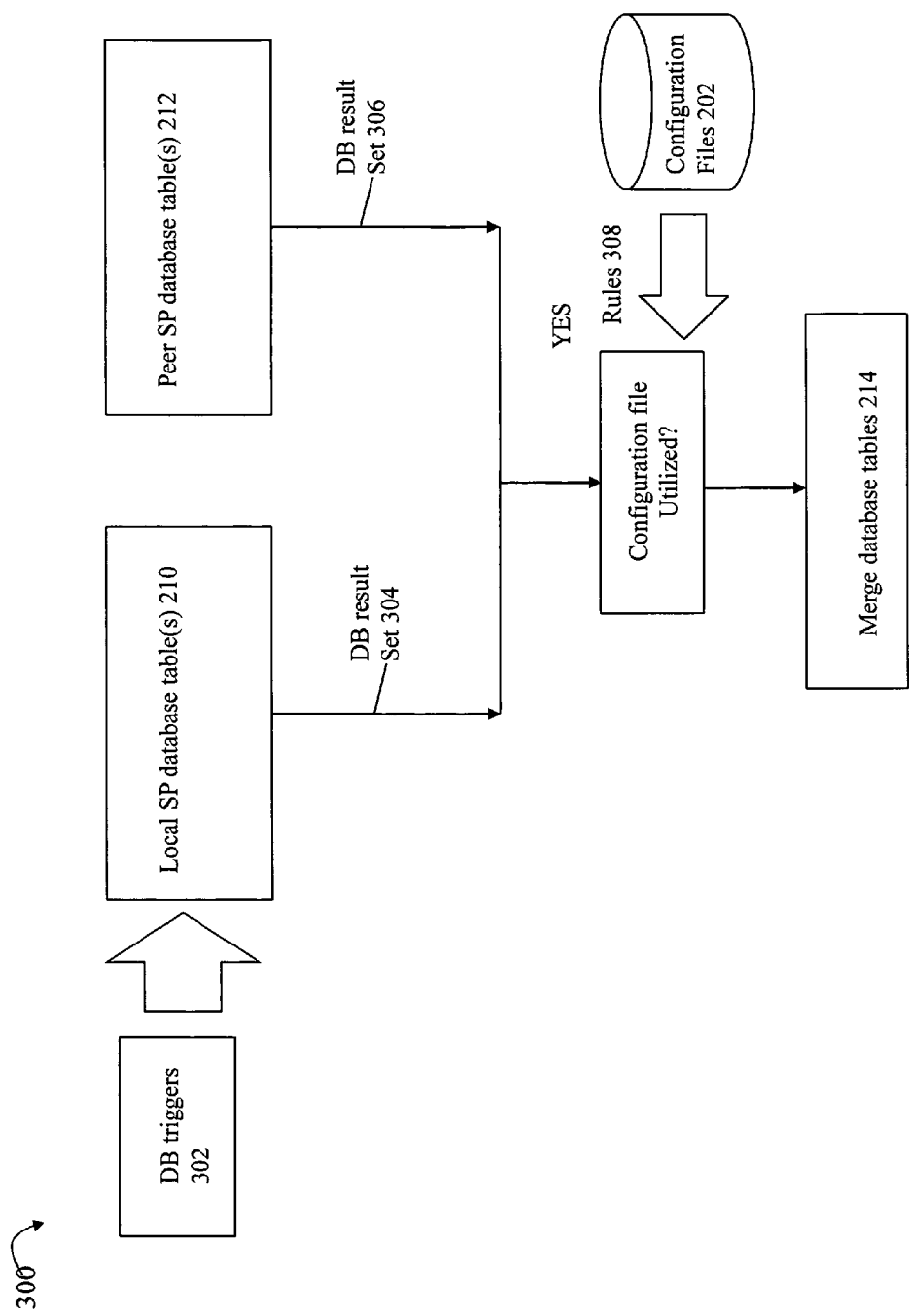

Referring to FIG. 5, shown is another example illustrating processing and associated data flow that may be performed in an embodiment in accordance with techniques herein. The example 300 provides another illustration of interaction between components of an embodiment. One or more database (DB) triggers 302 may be defined as described above to provide for database change notification to any of the local SP database tables 210 and the peer SP database tables 212. Upon the occurrence of a database operation which modifies (e.g., to add, delete or update) one or more rows of one or more identified database tables of 210, 212, the database 106 may determine a DB result set 304 using tables 210 and/or DB result set 306 using tables 212. Elements 304 and 306 may generally represent the data collected in connection with the monitored event occurrence, such as the particular database operation(s) performed. Consider, for example, a DB trigger which provides for change notification tracking for new rows added to the device database tables of 210 and 212 as described above. SP A's configuration information is included in tables 210 and SP B's configuration information is included in tables 212. Both SP A and SP B may view one or more new devices so that in connection with a current polling period, SP A and SP B's corresponding database tables are modified by adding new rows to existing database tables of 210, 212. In response, a DB trigger 302 provides for collecting DB result set 304 identifying the new rows added to SP A's device table included in 210. In a similar manner, the DB trigger 302 provides for collecting DB result set 306 identifying new rows added to SP B's device table included in 212. Processing is performed to apply any necessary rules 308 of the configuration files 202. It should be noted that rules may not be applied, for example, if there are no data conflicts between the DB result sets 304, 306 and/or the existing contents of the merge database tables 214. For example, if both DB results sets 304, 306 include the same one or more new devices and associated attribute values and there are no existing rows in the tables of 214 for these new devices, there is no conflict. The data for the new devices may simply be added as new rows to the merged device table (representing a consolidated data storage system view of devices) included in the merge database tables 214. Alternatively, if there are any differences or conflicts such as described above, one or more rules 308 may be applied to determine the appropriate operation and data applied to the merge database tables 214.

It should be noted that at startup, all tables of 210, 212 and 214 may be initially empty and then populated using the first collected set of data storage configuration information such as associated with an initial polling request. The tables of 210 and 212 are retained in addition to the merge database tables of 214 so that the tables of 210, 212 (e.g., pre-merge information) may be used in connection with other purposes. For example, such pre-merge information may be provided to the user for information purposes such as to allow a user to further investigate a detected data conflict/viewpoint conflict among the collective views of the different service processors.

As mentioned above, the techniques herein may be used in connection with multiple data storage systems, such as multiple arrays and/or appliances connected in a SAN or other storage network. In an embodiment having multiple data storage systems each having one or more service processors, a single data storage system may be designated as the consolidator. The single master SP of the consolidator system may communicate with each SP of each other data storage system. Alternatively, each data storage system may have a master SP which provides for collecting information for that data storage system. The master SP of the consolidator may then communicate with other master SPs of other data storage systems to facilitate configuration information collection. The foregoing are some examples of the hierarchical reporting structure that may be included in an embodiment in accordance with techniques herein. The hierarchy may have one or more levels of SPs and data storage systems for collecting configuration information for use in connection with techniques herein.

Figure 6:
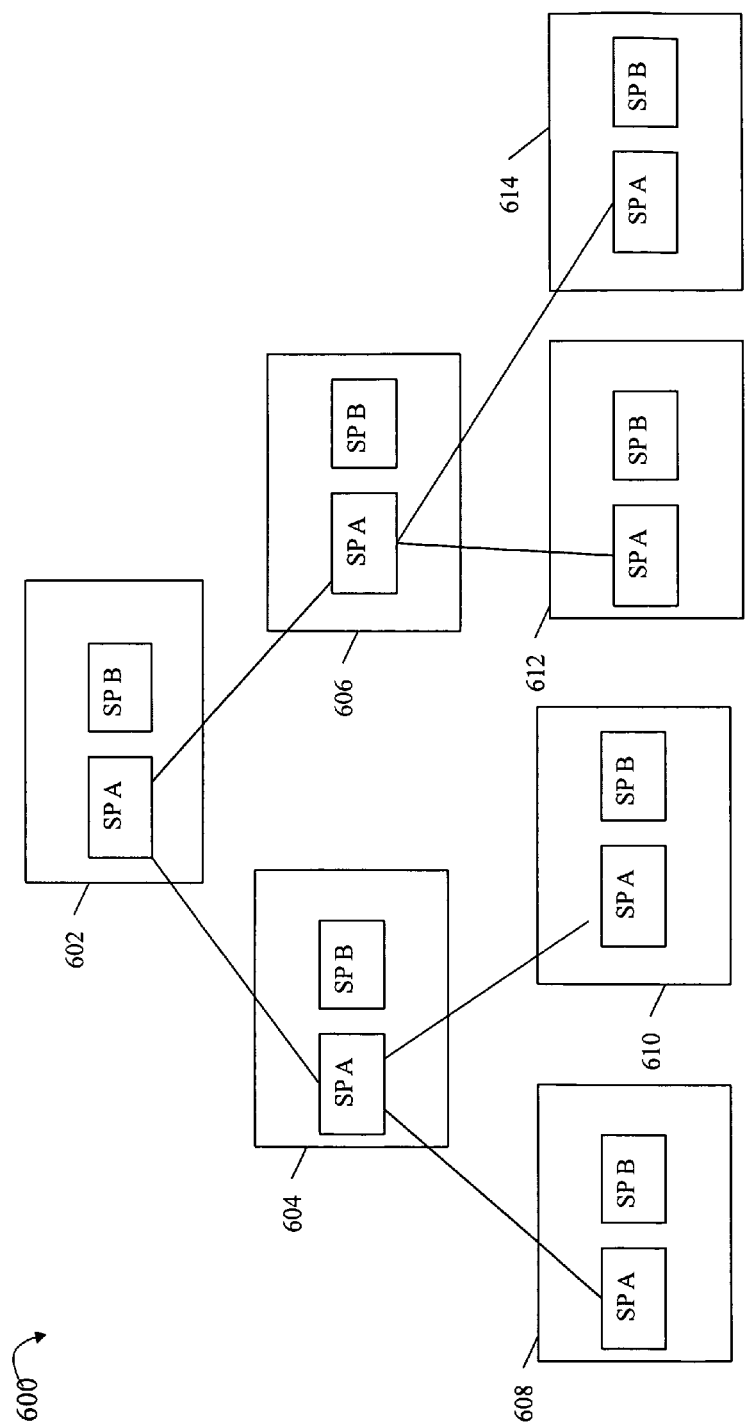
FIG. 6 is an example of a hierarchy of data storage systems that may be included in an embodiment in accordance with techniques herein.

Referring to FIG. 6, shown is an example illustrating an embodiment of a system in accordance with techniques herein including a hierarchy of data storage systems. The example 600 includes storage systems 602, 604, 606, 608, 610, 612 and 614. For purposes of illustration, each of the foregoing system may include two SPs—SP A and SP B where SP A may denote the master SP of each system. System 602 may be the designated single consolidator data storage system at a first or root level in the hierarchy. System 602 controls the polling and data collection. At the occurrence of a defined polling interval, SP A of system 602 may request information from the designated master SPs of storage system 604, 606 at a second level in the hierarchy. In turn, SP A of system 604 may request and collect its local configuration information and also issue a request for the configuration information from master SPs of systems 608 and 610 at a third level in the hierarchy. Master SPs of systems 608, 610 may report information up the hierarchy to system 604 which then reports the collected information (e.g., regarding all SPs of 604, 608 and 610) to the system 602. In a similar manner, system 602 requests information from 606, and system 606 requests information from systems 612, 614. System 606 collects information obtained locally using its own drivers and also information reported from systems 612, 614. System 606 then reports collected information (e.g., regarding all SPs of 606, 612 and 614) to system 602.

The foregoing is one exemplary hierarchy of configuration information collection that may be utilized in an embodiment including a plurality of data storage systems. The hierarchy of FIG. 6 includes a particular number of levels, processors in each system, and the like. However, the techniques herein may be readily applied for use with any hierarchy having more or less levels, more or less data storage systems, systems with differing numbers of service processors, and the like.

It should be noted that the embodiment described herein includes a data storage system with two service processors each seeing/viewing the same set of devices for failover purposes. If there are more than two service processors, the system may not be configured so that all service processors view and report information about all devices. Rather, the system may be configured to provide for redundancy in the event of failover but may partition all the devices among the processors so that not all processors view and report on all devices. For example, if there are 4 service processors in a data storage system, the embodiment may define two sets, each including a first and second service processor. In each set, the first service processor may report on a first half of the devices and other components in the system and the second service processor in the system may report on the remaining half of the devices and components in the system. If either the first or second service processor in a pair becomes inoperable, failover processing may provide, for example, for utilizing the second pair of processors. It should be noted that the techniques described herein are scalable for use in providing a consolidated view of the data storage system and may be easily extended to such additional variations as described in FIG. 6 with multiple SP node hardware architectures due to, for example, the use of configuration files to facilitate the SP information merging across multiple SP nodes, multiple data storage systems each including multiple SP nodes, and the like.

Figure 7:
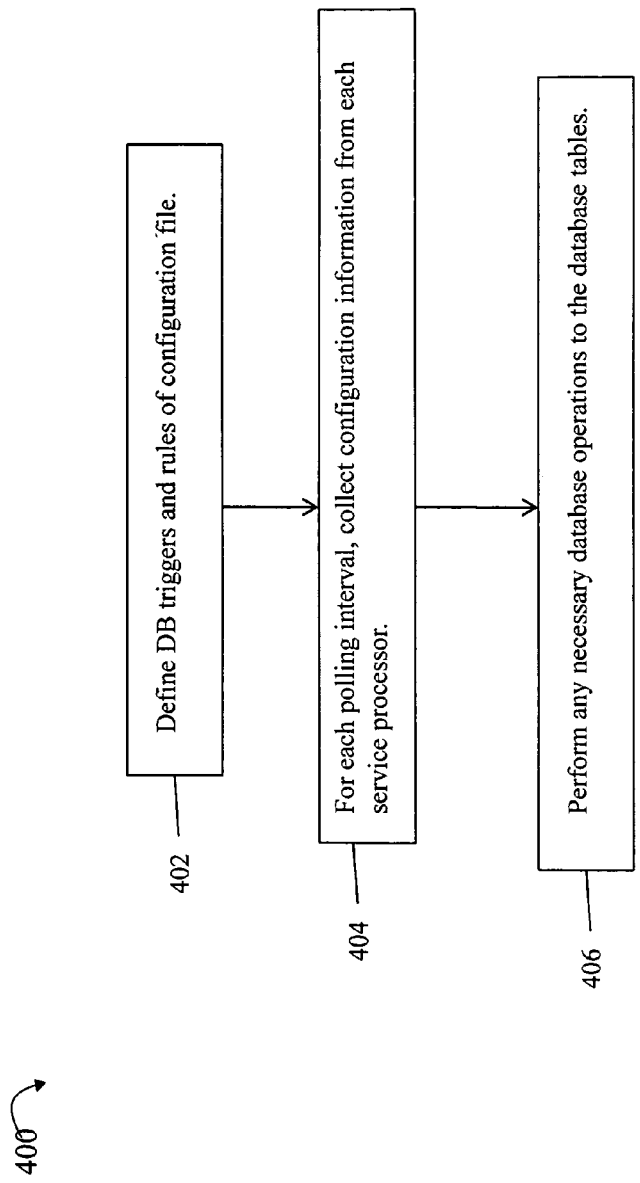
FIGS. 7 and 8 are examples of flowcharts including processing steps that may be performed in an embodiment in accordance with techniques herein.
Figure 8:
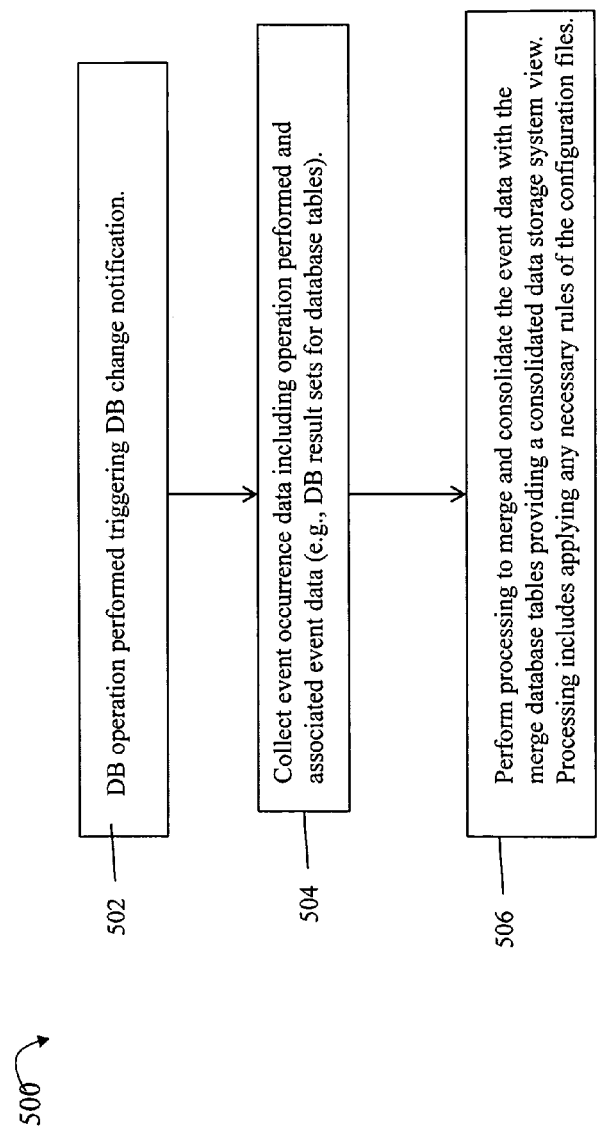

Referring now to FIGS. 7 and 8, shown are flowcharts of processing steps that may be performed in an embodiment in accordance with techniques herein. The steps of flowcharts 400 and 500 provide a high level description of steps summarizing processing described above. In the flowchart 400 of FIG. 7, at step 402, one or more DB triggers may be defined to provide for DB change notification for any operations which update any of the database tables included in 210 and 212. The rules of the configuration file may also be specified. At step 404, for each polling interval, configuration information for the data storage system may be collected from each service processor. At step 406, any necessary database operations are performed to the database tables of 210, 212 representing the individual data storage system configuration viewpoints for the service processors.

With reference to FIG. 8, flowchart 500 includes a step 502 where one of the database operations performed in step 406 triggers a database change notification. At step 504, event occurrence data for the change notification is collected. The event data may identify the database operation performed and the associated event data such as the database result sets for the tables 210, 212 as described above. At step 506, processing is performed to merge and consolidate the event occurrence data with the merge database tables providing an updated consolidated data storage system view. The processing of step 506 may include applying any necessary rules of the configuration files.

An embodiment may implement the techniques herein using code executed by a processor. For example, an embodiment may implement the techniques herein using code which is executed by a processor of the data storage system. As will be appreciated by those skilled in the art, the code may be stored on the data storage system on a computer-readable storage medium having any one of a variety of different forms including volatile and nonvolatile, removable and non-removable media implemented in any method or technology for storage of information such as computer readable instructions, data structures, program modules or other data. Computer-readable storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for providing a consolidated logical view of a system comprising:
providing a plurality of database tables associated with a plurality of processing nodes of a data storage system, wherein said plurality of database tables provides a plurality of individual views of the data storage system, each of said plurality of individual views representing a view of the data storage system for a different one of said plurality of processing nodes;
receiving notification regarding a modification to one or more of said plurality of database tables, said notification identifying an operation performed causing the modification and providing data associated with the modification; and
modifying a merge database table providing a consolidated view of said plurality of individual views, wherein said modifying is performed in accordance with said notification and a configuration file including logic describing processing performed to merge said plurality of individual views, wherein a first of the plurality of database tables associated with a first of the plurality of individual views is a first device table and a second of the plurality of data tables associated with a second of the plurality of individual views is a second device table, said first device table identifying at least one device that is not included in the second device table whereby said first device table includes a row for said at least one device and said second device table does not include a row for said at least one device, and wherein said configuration file includes at least one rule indicating to resolve a conflict in connection with merging the first and the second devices tables by taking a set union of devices in the first and the second device tables.

2. The method of claim 1, wherein the data storage system is a unitary storage system including said plurality of processing nodes, each of the processing nodes being a computer processor.

3. The method of claim 1, further comprising:
providing the merge database table to a user interface, said user interface providing said consolidated view to a user.

4. The method of claim 1, further comprising:
polling each of said plurality of processing nodes for a current set of state information describing a state of the data storage system in accordance with what components of the data storage system are accessible or visible to said each processing node.

5. The method of claim 4, wherein said plurality of processing nodes includes a single master node and said single master node performs said polling to obtain a current set of state information for itself and from each other node included in said plurality of processing nodes.

6. The method of claim 5, wherein said single master node performs said modifying and communicates with a user interface providing said consolidated view to a user.

7. The method of claim 5, wherein each of said plurality of processing nodes includes a same set of software components, said set of software components including a platform abstraction layer, said platforms abstraction layer of said single master node communicating with said platform abstraction layer of each other node included in said plurality of processing nodes to obtain a current set of state information from said each other node.

8. The method of claim 7, wherein said set of software components includes one or more drivers, said platform abstraction layer of said set being an interface layer in communication with said one or more drivers to collect information for said polling.

9. The method of claim 7, wherein the data storage system is a first of a plurality of data storage systems, each of said plurality of data storage systems including a plurality of processing nodes, each of said plurality of processing nodes being a computer processing node.

10. The method of claim 9, wherein each of said plurality of data storage systems other than said first data storage system reports information to the single master node of the first data storage system regarding a state of said each data storage system.

11. The method of claim 10, wherein each of said plurality of data storage systems other than said first data storage system includes a single master node that collects first information about itself and from other processing nodes of said each storage system and the single master node of said each data storage system reports the first information collected to said single master node of the first data storage system.

12. The method of claim 1, further comprising:
defining database triggers for said plurality of database tables to provide notification upon the occurrence of a modification to any of said plurality of database tables in accordance with any one of a plurality of operations causing the modification.

13. The method of claim 12, wherein the plurality of operations includes a new, a change and a delete with respect to a row of one of the plurality of database tables.

14. The method of claim 1, wherein said configuration file includes a plurality of rules indicating how to resolve any change conflicts with respect to multiple ones of said plurality of database tables and said merge database table.

15. The method of claim 14, wherein said plurality of processing nodes includes a single master node, one of said plurality of database tables indicates a view of said single master node and another of said plurality of database tables indicates a view of a second of said plurality of processing nodes, said plurality of rules including a first rule indicating that modifications made to said one database table of said single master node override any conflicting modifications made to said another database table.

16. The method of claim 15, wherein a first change is made to a first row of said one database table and a second change is made to a second row of said another database table, said first row and said second row representing information about a same object corresponding to a component in the data storage system, said first rule resulting in said merge table including said first row rather than said second row.

17. The method of claim 14, where said plurality of rules includes a first set of one or more static rules and a second set of one or more dynamic rules, each of said second set of dynamic rules including a callback to a method, said modifying said merge table including invoking the method.

18. The method of claim 17, wherein the method is invoked to provide additional information used in connection with said modifying said merge table.

19. A system comprising:
a data storage system;
a user interface that provides a consolidated logical view of components included in the system; and
wherein the data storage system includes:
a plurality of processing nodes;
a plurality of database tables associated with said plurality of processing nodes; wherein said plurality of database tables provides a plurality of individual views of the data storage system, each of said plurality of individual views representing a view of the data storage system for a different one of said plurality of processing nodes;

a database providing notification regarding a modification to any of said plurality of database tables, said notification identifying an operation performed causing the modification and providing data associated with the modification; and a merge database table providing a consolidated view of said plurality of individual views, wherein said merge database table is modified in accordance with said notification and a configuration file including logic describing processing performed to merge said plurality of individual views, wherein code of said user interface, said plurality of database tables, said configuration file, said database and said merge database table are stored in a memory, wherein a first of the plurality of database tables associated with a first of the plurality of individual views is a first device table and a second of the plurality of data tables associated with a second of the plurality of individual views is a second device table, said first device table identifying at least one device that is not included in the second device table whereby said first device table includes a row for said at least one device and said second device table does not include a row for said at least one device, and wherein said configuration file includes at least one rule indicating to resolve a conflict in connection with merging the first and the second devices tables by taking a set union of devices in the first and the second device tables.

20. A non-transitory computer readable medium comprising code stored thereon for providing a consolidated logical view of a system, the non-transitory computer readable medium comprising code stored thereon for:

providing a plurality of database tables associated with a plurality of processing nodes of a data storage system, wherein said plurality of database tables provides a plurality of individual views of the data storage system, each of said plurality of individual views representing a view of the data storage system for a different one of said plurality of processing nodes;

receiving notification regarding a modification to one or more of said plurality of database tables, said notification identifying an operation performed causing the modification and providing data associated with the modification; and modifying a merge database table providing a consolidated view of said plurality of individual views, wherein said modifying is performed in accordance with said notification and a configuration file including logic describing processing performed to merge said plurality of individual views, wherein a first of the plurality of database tables associated with a first of the plurality of individual views is a first device table and a second of the plurality of data tables associated with a second of the plurality of individual views is a second device table, said first device table identifying at least one device that is not included in the second device table whereby said first device table includes a row for said at least one device and said second device table does not include a row for said at least one device, and wherein said configuration file includes at least one rule indicating to resolve a conflict in connection with merging the first and the second devices tables by taking a set union of devices in the first and the second device tables.

* * * * *